(12) United States Patent
Frazzini et al.

(10) Patent No.: US 10,673,916 B1
(45) Date of Patent: Jun. 2, 2020

(54) EXECUTING APPLICATIONS IN REMOTELY EMULATED COMPUTING DEVICES

(71) Applicant: Amazon Technologies, Inc., Reno, NV (US)

(72) Inventors: Michael Anthony Frazzini, Seattle, WA (US); Ameesh Paleja, Irvine, CA (US); Gerard J. Heinz, II, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 1358 days.

(21) Appl. No.: 14/044,255

(22) Filed: Oct. 2, 2013

Related U.S. Application Data

(63) Continuation of application No. 13/174,995, filed on Jul. 1, 2011, now Pat. No. 8,572,178.

(51) Int. Cl.
*G06F 15/16* (2006.01)
*H04L 29/06* (2006.01)

(52) U.S. Cl.
CPC .................................. *H04L 65/60* (2013.01)

(58) Field of Classification Search
CPC ......................................................... H04L 65/60
See application file for complete search history.

(56) References Cited

U.S. PATENT DOCUMENTS

| | | | |
|---|---|---|---|
| 7,139,791 B1 * | 11/2006 | Coleman | H04L 29/06027 709/203 |
| 7,925,734 B2 | 4/2011 | Leduc | |
| 7,975,051 B2 | 6/2011 | Saint Clair et al. | |
| 8,170,701 B1 | 5/2012 | Lu | |
| 8,301,270 B2 | 10/2012 | Quail | |
| 9,268,670 B1 * | 2/2016 | Lachwani | G06F 11/3684 |
| 2004/0015950 A1 * | 1/2004 | Dutta | G06F 8/60 717/171 |
| 2005/0193139 A1 * | 9/2005 | Vinson | G06F 9/445 709/231 |
| 2006/0080702 A1 * | 4/2006 | Diez | A63F 13/12 725/30 |
| 2006/0184670 A1 * | 8/2006 | Beeson | H04L 43/026 709/224 |
| 2007/0032247 A1 | 2/2007 | Shaffer et al. | |
| 2009/0210898 A1 * | 8/2009 | Childress | H04H 60/46 725/34 |

(Continued)

OTHER PUBLICATIONS

U.S. Patent Application entitled "Remotely Emulating Computing Devices" filed May 24, 2011 and assigned U.S. Appl. No. 13/114,534.

(Continued)

*Primary Examiner* — Jonathan A Bui
(74) *Attorney, Agent, or Firm* — Thomas | Horstemeyer, LLP

(57) ABSTRACT

Disclosed are various embodiments that facilitate execution of applications through remotely emulated computing devices. An application is executed in a hosted environment. A video signal of the application is encoded into a media stream, which is sent to a client computing device. In various embodiments, access to data that is locally available to the client computing device is facilitated. In various embodiments, data related to the operation of the application is recorded.

13 Claims, 7 Drawing Sheets

(56) References Cited

U.S. PATENT DOCUMENTS

| | | |
|---|---|---|
| 2010/0057840 A1 | 3/2010 | Schlusser |
| 2010/0191352 A1 | 7/2010 | Quail |
| 2011/0113121 A1 | 5/2011 | Sarkar |
| 2011/0225513 A1* | 9/2011 | Lauwers .................... G06F 3/16 |
| | | 715/756 |
| 2011/0276722 A1 | 11/2011 | Balestriere et al. |
| 2012/0013547 A1 | 1/2012 | Tsirkin et al. |
| 2012/0030394 A1 | 2/2012 | Bird |
| 2012/0051229 A1* | 3/2012 | Feldmann ............... H04L 43/12 |
| | | 370/242 |
| 2012/0089546 A1* | 4/2012 | Ahmed ............. G06Q 30/0203 |
| | | 706/45 |
| 2012/0095796 A1* | 4/2012 | Gately ............. G06Q 10/06311 |
| | | 705/7.13 |
| 2012/0137178 A1* | 5/2012 | Barsness ............... G06F 11/362 |
| | | 714/35 |
| 2012/0144053 A1 | 6/2012 | Futty et al. |
| 2012/0245918 A1 | 9/2012 | Overton et al. |
| 2012/0277003 A1 | 11/2012 | Eliovits et al. |
| 2012/0284324 A1* | 11/2012 | Jarville .............. G06Q 30/0201 |
| | | 709/203 |
| 2012/0311106 A1* | 12/2012 | Morgan .............. H04L 41/0806 |
| | | 709/220 |
| 2014/0075371 A1* | 3/2014 | Carmi ................. G06F 11/3438 |
| | | 715/781 |
| 2014/0218385 A1* | 8/2014 | Carmi .................... G09G 5/377 |
| | | 345/590 |

OTHER PUBLICATIONS

U.S. Patent Application Entitled "Adding latency to Improve Perceived Performance" filed Oct. 29, 2010 and assigned U.S. Appl. No. 12/916,111.

U.S. Patent Application entitled "Accommodating latency in a Service-Based Application" filed Sep. 17, 2010 and assigned U.S. Appl. No. 12/885,296.

\* cited by examiner

EXECUTING APPLICATIONS IN REMOTELY EMULATED COMPUTING DEVICES

CROSS-REFERENCE TO RELATED APPLICATIONS

This application is a continuation of, and claims priority to, co-pending U.S. Patent Application entitled "EXECUTING APPLICATIONS IN REMOTELY EMULATED COMPUTING DEVICES," filed on Jul. 1, 2011, and assigned application Ser. No. 13/174,995, which is incorporated herein by reference in its entirety.

BACKGROUND

There are many specialized forms of computing devices such as, for example, smartphones, electronic book readers, tablet computers, video game consoles, and so on. Because of the physical differences among such devices, applications may differ from device to device. Even within a device category such as smartphones, different models of smartphones may have different display and input features. Developers may have difficulties testing applications for such devices. Actual use by end users is an ideal way to identify application defects, but it is difficult to distribute applications and application updates to end users.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to executing applications on emulated computing devices over a network. Customers may wish to purchase applications for various computing devices over a network. In order to make an informed purchasing decision, a customer may wish to try the application before buying it. However, the customer may be using a different client device from the computing device that is intended to run the application. For example, the customer may be using a desktop computer and searching for applications for a mobile device such as a smartphone. Various embodiments of the present disclosure enable customers to use applications running remotely on emulated computing devices. Furthermore, in some embodiments, the customers may be able to buy the applications through an associated user interface. Various techniques related to executing applications remotely are described in U.S. Patent Application entitled "Remotely Emulating Computing Devices" filed on May 24, 2011 and assigned application Ser. No. 13/114,534, which is incorporated herein by reference in its entirety.

While using a remotely executed application, customers may wish to allow the application to access photos, documents, and/or other data stored on their local machine. Various embodiments of the present disclosure facilitate access to locally accessible data of a client by remotely executed applications. Additionally, various embodiments of the present disclosure are configured to allow a developer to deploy an application for testing by multiple users. Feedback and/or other operational data may be recorded for the developer. In the following discussion, a general description of the system and its components is provided, followed by a discussion of the operation of the same.

Figure 1:
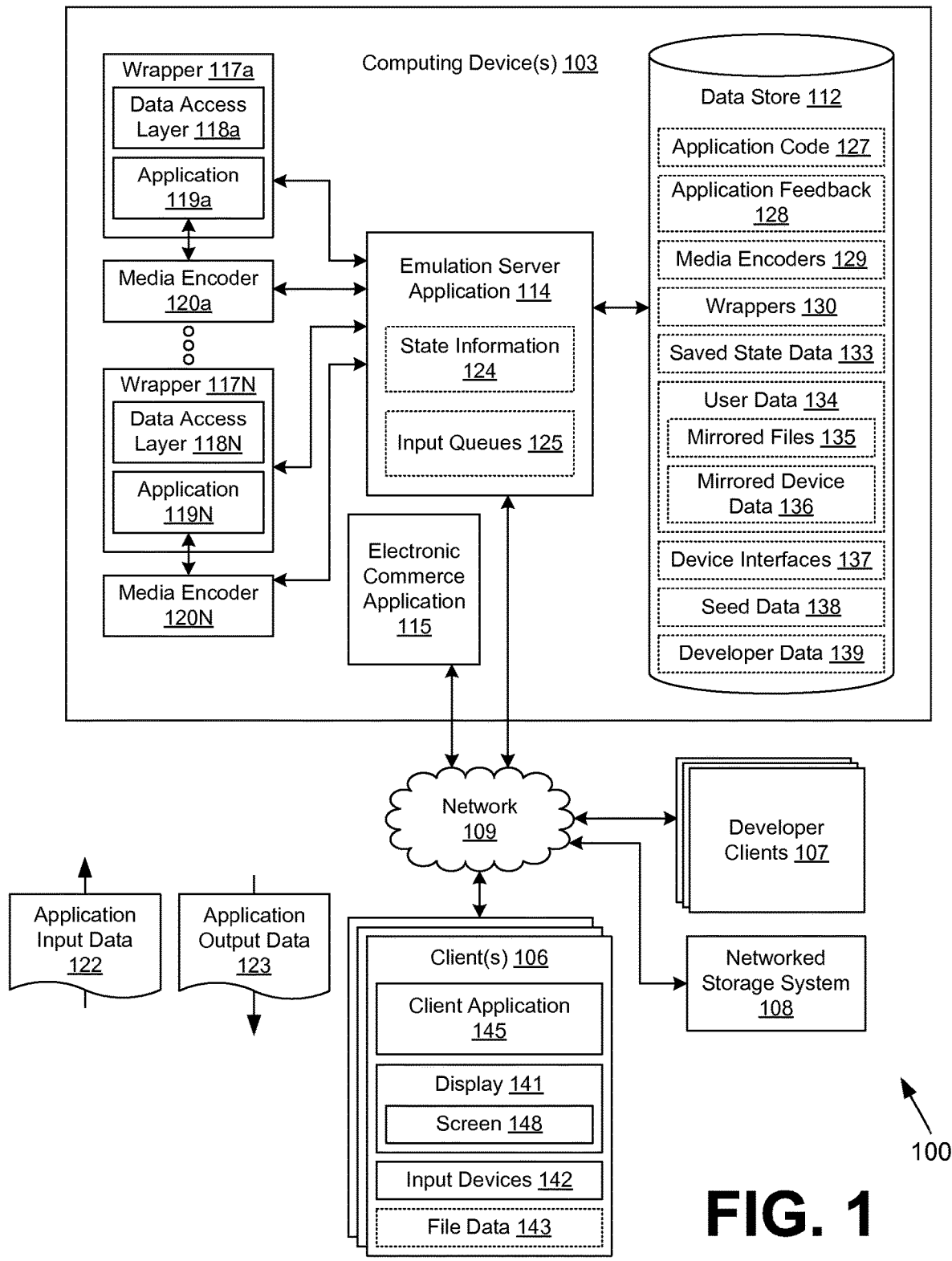
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106, one or more developer clients 107, and a networked storage system 108 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include a emulation server application 114, an electronic commerce application 115, a plurality of wrappers 117a . . . 117N including a respective data access layer 118a . . . 118N, a plurality of applications 119a . . . 119N, a plurality of media encoders 120a . . . 120N, and other applications, services, processes, systems, engines, or functionality not discussed in detail herein. The emulation server application 114 may correspond to a type of application session server. The emulation server application 114 is executed to launch instances of applications 119, which are executed within the wrappers 117. The emulation server application 114 is also executed to obtain application input data 122 from the clients 106 and provide the application input data 122 to the respective wrapper 117. In various embodiments, the application input data 122 may include data that is locally accessible to the client 106 (e.g., files, device data, etc.) which may be mirrored in the data store 112 for access by the application 119.

The emulation server application 114 is also executed to send application output data 123 that is captured from the application 119 to the clients 106. The emulation server application 114 may communicate with the client 106 over various protocols such as, for example, hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), transmission control protocol (TCP), and/or other protocols for communicating data over the network 109. The emulation server application 114 is configured to maintain state information 124 and input queues 125 associated with the executing applications 119.

In various embodiments, the emulation server application 114 may be configured to generate a user interface using one or more network pages. The network pages may include the streaming video and/or audio generated by the emulated application 119. In various embodiments, images of virtual input devices may be rendered in conjunction with the streaming video and/or audio. For example, a virtual keyboard for the emulated computing device may be included in the network page. Where the emulated computing device is a mobile computing device, an image of the mobile computing device may be included in the network page. The emulation server application 114 may facilitate interaction with the image of the mobile computing device in conjunction with the application 119. Where the emulated computing device corresponds to a mobile computing device with a screen, the video captured from the application 119 may be surrounded by the image of the mobile computing device, as if the video were shown on the screen of the mobile computing device. However, in other embodiments, the video may be shown full screen, without being surrounded by the image of the mobile computing device.

The electronic commerce application 115 is executed in order to facilitate the online purchase of items, such as downloaded applications, from a merchant over the network 109. The electronic commerce application 115 also performs various backend functions associated with the online presence of a merchant in order to facilitate the online purchase of items. For example, the electronic commerce application 115 may generate network pages or portions thereof that are provided to clients 106 for the purposes of selecting items for purchase, rental, download, lease, or other forms of consumption. In some embodiments, the electronic commerce application 115 is associated with a network site that includes an electronic marketplace in which multiple merchants participate.

The application 119 may correspond, for example, to a game or other types of applications. As non-limiting examples, the application 119 may correspond to a first-person shooter game, an action game, an adventure game, a party game, a role-playing game, a simulation game, a strategy game, a vehicle simulation game, and/or other types of games. The application 119 may be originally designed for execution in a general-purpose computing device or in a specialized device such as, for example, a smartphone, a video game console, a handheld game device, an arcade game device, etc. The applications 119 may also correspond to mobile phone applications, computer-aided design (CAD) applications, computer-aided manufacturing (CAM) applications, photo manipulation applications, video editing applications, office productivity applications, operating systems and associated applications, emulators for operating systems, architectures, and capabilities not present on a consumer device, and other applications and combinations of applications.

The application 119 may expect to access one or more resources of the device on which it is executed. Such resources may correspond to display devices, input devices, or other devices. In some cases, the application 119 may request exclusive access to one or more of the resources, whereby no other applications may have access to the particular resources.

The wrapper 117 corresponds to an application that provides a hosted environment for execution of the application 119. In various embodiments, the wrapper 117 may be configured to provide a virtualized environment for the application 119 by virtualizing one or more of the resources that the application 119 expects to access. Such resources may include a keyboard, a mouse, a joystick, a video device, a sound device, a global positioning system (GPS) device, an accelerometer, a touchscreen, built-in buttons, a file system, a built-in battery, etc. In this way, the wrapper 117 is able to provide input commands and other data to the application 119 as if the wrapper 117 emulates a keyboard, a mouse, or another type of hardware device.

Further, the wrapper 117 is able to obtain a video signal and/or audio signal generated by the application 119 as if the wrapper 117 emulates a display device, an audio device, or another type of output device. Although many of the examples discussed herein relate to emulated computing devices with a display, emulated computing devices may also include, for example, set-top boxes, audio players, and/or other devices without an integrated display screen. The wrapper 117 is able to encode the video signal and/or audio signal by way of one or more media encoders 120 into a media stream. To this end, the wrapper 117 may include various types of media encoders 120, such as, for example, Moving Pictures Experts Group (MPEG) encoders, H.264 encoders, Flash® video encoders, etc. Such media encoders 120 may be selected according to factors such as, for example, data reduction, encoding quality, latency, etc. In some embodiments, the wrappers 117 may communicate directly with the clients 106 to obtain the application input data 122 and to serve up the application output data 123.

Different types of wrappers 117 may be provided for different applications 119 or classes of applications 119. As non-limiting examples, different wrappers 117 may be provided for applications 119 using different application programming interfaces (APIs) such as OpenGL®, DirectX®, the Graphics Device Interface (GDI), and so on. Where the application 119 is configured for execution in a specialized device or another type of computing device, the wrapper 117 may include an emulation application that emulates the device. In some embodiments, the output of the application 119 may be captured by the wrapper 117 at a device level. For example, the application 119 may be executed in a physical game console, and the video output may be captured by way of a video graphics array (VGA) connection, a high-definition multimedia interface (HDMI) connection, a component video connection, a national television system committee (NTSC) television connection, and/or other connections. In other embodiments, the output of the application 119 may be captured by the wrapper 117 by intercepting system calls, such as drawing calls under a graphics API or other system calls.

The data access layer 118 of the wrapper 117 may be used to facilitate access to data that is locally available to the client 106. Such data may include files such as photos, documents, spreadsheets, audio files, video files, and other types of files. Such data may also include data generated in a component of the client 106 such as GPS location data, accelerometer data, and/or other data. The data may be stored in a data store of the client 106 or in the networked storage system 108.

The state information 124 that is maintained by the emulation server application 114 includes various data relating to application sessions that are currently active. For example, the state information 124 may track the users that are currently participating in the application session, status information associated with the users, security permissions associated with the application session (e.g., who can or cannot join), and so on. In some embodiments, some or all of the state information 124 may be discarded when an application session ends. The input queues 125 collect input commands from the application input data 122 for a given application 119. The input commands may be reordered to a correct sequence and delays may be inserted between commands to ensure that they are interpreted correctly when presented to the corresponding application 119.

The data stored in the data store 112 includes, for example, application code 127, application feedback 128, media encoders 129, wrappers 130, saved state data 133, user data 134 including mirrored files 135 and mirrored device data 136, device interfaces 137, seed data 138, developer data 139, and potentially other data. The application code 127 corresponds to a library of different applications that are available to be launched as applications 119. The application code 127 may correspond to executable code within the computing device 103. Alternatively, the application code 127 may correspond to code that is executable within another type of device but is not executable within the computing device 103. Such application code 127 may be referred to as "binaries," read-only memory images (ROMs), and other terms. Application code 127 may be executed as multiple instances of the applications 119 for multiple application sessions. In one embodiment, the application code 127 may include source code for applications 119. In some cases, the application code 127 may correspond to beta code, testing code, trial code, sample code, etc. that is less than a fully released production version.

The application feedback 128 may include operational data relating to the operation of the instances of the application 119. Such operational data may include debugging information, defect information, usage information, crash information, core dumps, and/or other data that may be useful to developers, marketers, and so on. The application feedback 128 may also include responses to surveys by users of the applications 119. Such surveys may be presented to the user in conjunction with the user interface served up by the emulation server application 114.

The media encoders 129 correspond to the various types of media encoders 120 that may be employed in the computing device 103. Some media encoders 129 may correspond to specific formats, such as, for example, H.264, MPEG-4, MPEG-2, and/or other formats. The wrappers 130 correspond to the executable code that implements the various types of wrappers 117. The wrappers 130 are executable in the computing device 103 and may be executed as multiple instances of the wrappers 117 for multiple application sessions.

The saved state data 133 corresponds to game states that have been saved by the applications 119. Because the applications 119 may be executed in a virtualized environment, the applications 119 may write state information to a virtual location, which is then mapped for storage in the data store 112 as the saved state data 133. The saved state data 133 may correspond to data saved normally by the application 119 or may correspond to a memory image of the application 119 that may be resumed at any time.

The user data 134 includes various data related to the users of the applications 119, such as, for example, types of computing devices associated with a user, security credentials, application preferences, billing information, a listing of other users that are permitted to join application sessions started by the user, and so on. In various embodiments, the user data 134 may also include copies of data that is locally accessible to the client 106. Such data may include mirrored files 135 and mirrored device data 136.

The mirrored files 135 may correspond to copies of images, videos, music, documents, etc. that are obtained from the client 106 or the networked storage system 108 on behalf of the client 106. The mirrored device data 136 corresponds to GPS location data, accelerometer data, etc. generated in a component of the client 106 and maintained in the computing device 103 so that the applications 119 may have access. In one embodiment, the mirrored files 135 and/or the mirrored device data 136 may correspond to a temporary cache of the data. In one embodiment, the mirrored files 135 may correspond to a group of files stored in the client 106 (e.g., all files in a folder, all files on a drive, all files matching a filename mask, etc.), while in another embodiment, the mirrored files 135 may correspond to files that are accessed or predicted to be accessed by the application 119. In one embodiment, the mirrored files 135 may be explicitly designated by the user.

The device interfaces 137 correspond to images, animations, code, hypertext markup language (HTML), extensible markup language (XML), cascading style sheets (CSS), and/or other data that may be used to generate a graphical representation of a virtualized computing device. It is noted that an application 119 that is executable on a particular computing device platform may be associated with a multitude of device interfaces 137. As a non-limiting example, the Android® platform for smartphones may be supported by a multitude of different models of smartphones. Some of the models may have mini-keyboards with a touchscreen, while others may have merely a touchscreen with no physical mini-keyboard. The models may have different controls and casings. Therefore, different device interfaces 137 may be provided for different models of Android® smartphones.

In some embodiments, multiple different device interfaces 137 may be used in conjunction with one wrapper 130. Where the emulated computing device does not include an integrated display, the device interface 137 may include a representation of an external display device showing video generated by the emulated computing device. Similarly, other non-integrated external devices that may connect to the emulated computing device (e.g., keyboards, mice, etc.) may be represented by the device interface 137.

The seed data 138 corresponds to a library of default data that may be accessed by the application 119. In some cases, the seed data 138 may be accessed in place of mirrored files 135 or mirrored device data 136, for example, when the mirrored files 135 or mirrored device data 136 are unavailable. In one embodiment, the seed data 138 for an application 119 may be provided by a developer of the application 119. In another embodiment, the seed data 138 may be generic data that may be used by many different applications 119. As a non-limiting example, the seed data 138 may include a default GPS location that is to be used when no GPS location is available from the client 106. As another non-limiting example, the seed data 138 may include a sample photo for use by a photo-editing application 119.

The developer data 139 may include various information related to developers of the applications 119. For example, a developer may have an account for uploading the application code 127, configuring surveys and data collection for the application feedback 128, uploading seed data 138, and/or performing other tasks. The developer data 139 may include compilation instructions for source code of the application code 127 to be compiled into code that is executable within a particular wrapper 117.

The client 106 is representative of a plurality of client computing devices that may be coupled to the network 109. The clients 106 may be geographically diverse. The client 106 may comprise, for example, a processor-based system such as a computer system. Such a computer system may be embodied in the form of a desktop computer, a laptop computer, personal digital assistants, cellular telephones, smartphones, set-top boxes, televisions that execute applications and can access the network 109, music players, web pads, tablet computer systems, game consoles, electronic book readers, or other devices with like capability.

The client 106 may include a display 141. The display 141 may comprise, for example, one or more devices such as cathode ray tubes (CRTs), liquid crystal display (LCD) screens, gas plasma-based flat panel displays, LCD projectors, or other types of display devices, etc. The client 106 may include one or more input devices 142. The input devices 142 may comprise, for example, devices such as keyboards, mice, joysticks, accelerometers, light guns, game controllers, touch pads, touch sticks, push buttons, optical sensors, microphones, webcams, and/or any other devices that can provide user input. Additionally, various input devices 142 may incorporate haptic technologies in order to provide feedback to the user.

Various data may be stored in the client 106 as file data 143. The file data 143 may correspond to images, audio, video, documents, and/or other types of files. The file data 143 may be stored in any data store that is locally accessible to the client 106. Such a data store may include, for example, hard drives, flash drives, memory sticks, floppy disks, compact discs, tape drives, network-attached storage, networked storage systems 108, and/or other types of data stores.

The client 106 may be configured to execute various applications such as a client application 145 and/or other applications. The client application 145 is executed to allow a user to launch, join, play, or otherwise interact with an application 119 executed in the computing device 103. To this end, the client application 145 is configured to capture input commands provided by the user through one or more of the input devices 142 and send this input over the network 109 to the computing device 103 as application input data 122. The application input data 122 may also incorporate file data 143 and other data (e.g., GPS data, audio data, etc.) generated in a component of the client 106 for use by the application 119. In various embodiments, the client application 145 corresponds to a browser application.

The client application 145 is also configured to obtain application output data 123 over the network 109 from the computing device 103 and render a screen 148 on the display 141. To this end, the client application 145 may include one or more video and audio players to play out a media stream generated by an application 119. In one embodiment, the client application 145 comprises a plug-in or other client-side code executed within a browser application. The client 106 may be configured to execute applications beyond the client application 145 such as, for example, browser applications, email applications, instant message applications, and/or other applications. In some embodiments, multiple clients 106 may be employed for one or more users to interact with the application 119. As non-limiting examples, some clients 106 may be specialized in display output, while other clients 106 may be specialized in obtaining user input. It is noted that different clients 106 may be associated with different latency requirements which may affect a delay employed before providing input commands to the application 119.

The developer client 107 is representative of a plurality of client computing devices, operated by developers, which may be coupled to the network 109. The developer client 107 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The developer client 107 may include a display comprising, for example, one or more devices such as cathode ray tubes (CRTs), liquid crystal display (LCD) screens, gas plasma-based flat panel displays, LCD projectors, or other types of display devices, etc.

The developer client 107 may be configured to execute various applications such as a browser and/or other applications. The browser may be executed in a developer client 107, for example, to access and render network pages, such as web pages, or other network content served up by the computing device 103 and/or other servers. The developer client 107 may be configured to execute other applications such as, for example, compilers, interpreters, software development applications, software debugging applications, email applications, instant message applications, and/or other applications.

A networked storage system 108 may be employed to provide access to files stored in a cloud computing resource comprising a networked plurality of computing devices. In some embodiments, the networked storage system 108 may correspond to a virtual file system where the actual data objects of the files are stored in a separate data storage system. A metadata service may be used to associate metadata with the files, thereby facilitating searches of the files using the metadata. By storing files in such a networked storage system 108, users may access the files from any client 106 that has network 109 connectivity.

The networked storage system 108 maintains a file hierarchy of files and folders in networked or metadata-based file systems for users. To this end, the networked storage system 108 may support various file-related operations such as, for example, creating files, deleting files, modifying files, setting permissions for files, downloading files, and/or other operations. The networked storage system 108 may be configured to maintain a record of file activity, e.g., uploading of files, downloading of files, deletion of files, etc. The networked storage system 108 may be configured to serve up data addressed by URL via HTTP. Each of the users of the networked storage system 108 may have a separate user account with security credentials to prevent unauthorized use.

Figure 2A:
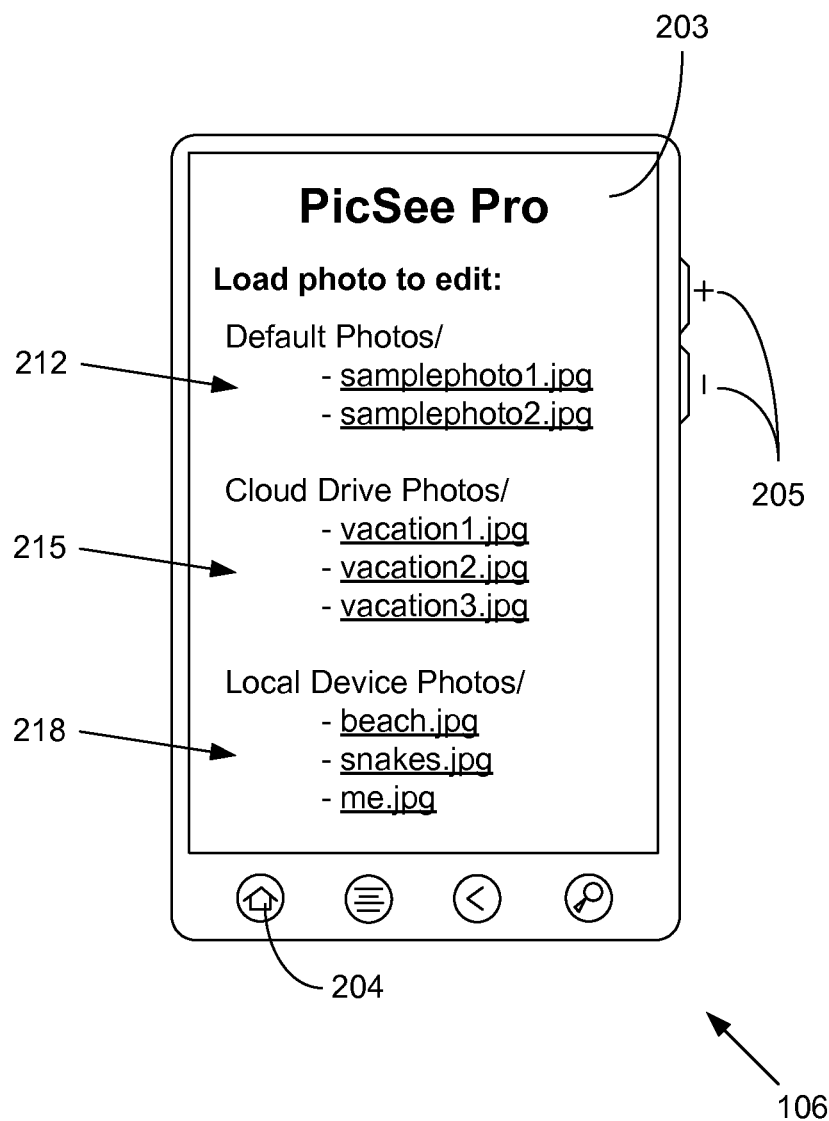
FIGS. 2A and 2B show examples of user interfaces rendered in a client in the networked environment of FIG. 1 according to various embodiments of the present disclosure.

Turning now to FIG. 2A, shown is one example of a client 106 in the networked environment 100 (FIG. 1). The client 106 has a screen 148 (FIG. 1) that is rendering a user interface 203 generated by a client application 145 (FIG. 1). In one embodiment, the user interface 203 corresponds to a network page rendered in a browser executed in the client 106. The user interface 203 may also be generated by a special-purpose application executed in the client 106.

The user interface 203 corresponds to a video portion of a media stream generated by the emulation server application 114 (FIG. 1). The media stream is associated with an application 119 (FIG. 1) for photo-editing that is titled "PicSee Pro." The client 106 may have various input buttons 204 which may generate various input commands that are sent to the emulation server application 114 as application input data 122 (FIG. 1). An audio portion of the media stream may be played out by the client application 145 in conjunction with the video portion of the media stream. Audio hardware controls 205 may be provided to control the audio playback from the client 106 and/or emulated computing device, e.g., increasing or decreasing the volume of the audio. In other examples, other hardware controls may be provided, e.g., record, fast forward, rewind, stop, previous track, next track, screen brightness, selected display device, etc.

The user interface 203 in the example of FIG. 2A relates to selecting a photo to be edited by the application 119. A first group of options 212 allows a user to select default photos, for example, photos that are available to any user from the seed data 138 (FIG. 1). The data access layer 118 may make the seed data 138 appear as local data for the emulated computing device. A second group of options 215 allows a user to select photos from an account of the user in the networked storage system 108 (FIG. 1). Such photos, when selected, may be loaded automatically from the networked storage system 108 by the data access layer 118 with user account data obtained from the client 106 (e.g., security credentials and/or other data). A third group of options 218 allows the user to select photos that are stored in the client 106 as file data 143 (FIG. 1). Such photos, when selected, may be loaded automatically by the data access layer 118 from the client 106 over the network 109 (FIG. 1).

Data that is loaded remotely, either from the networked storage system 108 or from the client 106, may be preloaded in advance or loaded on-demand by the data access layer 118. In one example, the data access layer 118 may employ a complete mirror of the data in the data store 112 (FIG. 1). In another example, only the data that is selected in the application 119 is loaded over the network 109. In yet another example, a user at the client 106 may explicitly designate to which locally accessible data the data access layer 118 is to have access. The user may grant or deny access for listings of files as well as the files themselves. This user selection may be performed as part of the user interface 203 generated by the application 119 or an auxiliary portion of the user interface 203 which is generated in part by the data access layer 118 or another application executed in the computing device 103.

Figure 2B:
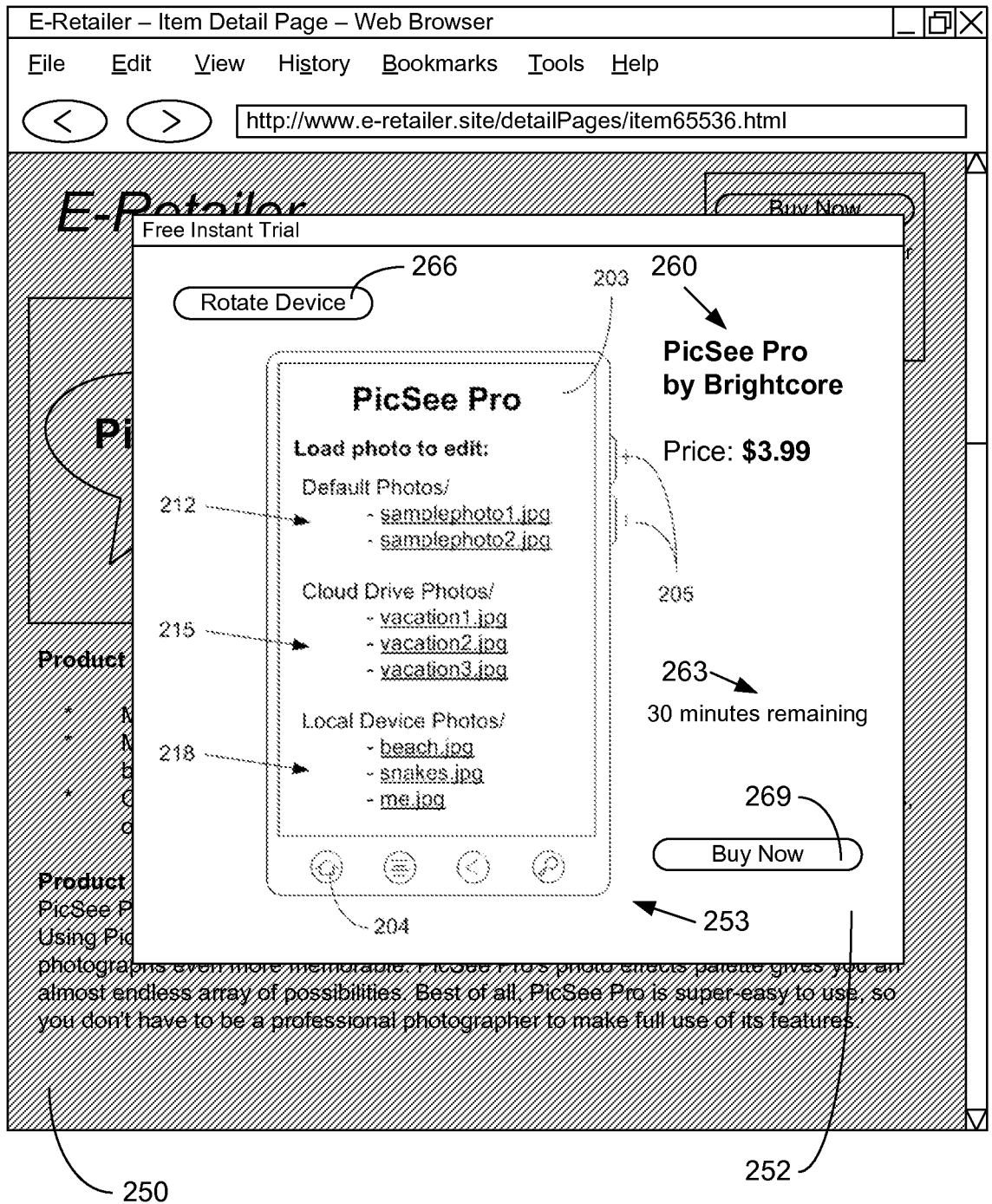

Continuing on to FIG. 2B, shown is another example of a user interface 250 rendered in a client application 145 (FIG. 1) executed in a client 106 (FIG. 1) in the networked environment 100 (FIG. 1). The user interface 250 shown in FIG. 2B corresponds to a network page generated by the electronic commerce application 115 (FIG. 1) overlaid with a user interface 252 that is a lightbox. In other examples, the user interface 252 may be presented in a full-screen format or another format. Portions of the user interface 252 may be generated by the electronic commerce application 115, while other portions of the user interface 252 may be generated by the emulation server application 114 (FIG. 1).

The user interface 252 includes a device interface 253 that is a graphical representation of an emulated computing device (e.g., the client 106 shown in FIG. 2A), which is in this case a particular model of an Android® smartphone. In some examples, the device interface 253 may correspond to a generic version of the emulated computing device, e.g., a generic version of an Android® smartphone. Which model is used may be specified by the customer in the user interface 250 or the user interface 252. In addition, a preference for a model of the emulated computing device may be stored in the user data 134 (FIG. 1).

The device interface 253 is generated by the emulation server application 114 from the applicable device interface 137 (FIG. 1). The device interface 253 includes virtual versions of input buttons 204 and/or other controls that are present in the actual device. Animations and/or images may be used to translate the physical experience into a virtual experience. Within the device interface 253 is a screen 148 (FIG. 1) showing the user interface 203 from FIG. 2A, which corresponds to the video portion of a media stream captured by the wrapper 117 (FIG. 1) from an application 119 (FIG. 1) that corresponds to the selected application code 127 (FIG. 1). An audio portion of the media stream may be played out by the client application 145 in conjunction with the video portion of the media stream. Audio hardware controls 205 may be provided to control the audio playback from the emulated computing device, e.g., increasing or decreasing the volume of the audio. In other examples, other hardware controls may be provided, e.g., record, fast forward, rewind, stop, previous track, next track, screen brightness, selected display device, etc.

The user interface 252 may also include descriptive information 260 that may, for example, be an abbreviated version of a description in the underlying network page of the user interface 250. The descriptive information 260 may include title, publisher, price, narrative description, and/or other information about the application code 127. In this non-limiting example, the user interface 252 includes a timer 263 because the time spent testing the application code 127 for possible purchase is limited. In other examples, the time for use of the application code 127 by the customer may be unlimited.

The user interface 252 may include an orientation control 266 to rotate the orientation of the screen 148. Activating such an orientation control 266 may cause a virtualized version of an accelerometer or other device to inform the application 119 that the orientation of the emulated computing device has been changed, e.g., from portrait to landscape and vice versa. The user interface 252 may also include one or more purchase components 269 for initiating a purchase of the application code 127 or adding the application code 127 to a shopping cart, wish list, gift registry, or other list of items as can be appreciated.

Next, with reference to FIGS. 1, 2A, and 2B, a general description of the operation of the various components of the networked environment 100 is provided. To begin, a customer at a client 106 may, for example, browse a network site served up by the electronic commerce application 115. The customer may, for example, navigate a catalog taxonomy, execute a search query, select links, and/or perform other navigational functions. The customer may arrive at a detail network page such as that shown in the user interface 200 of FIG. 2A or another similar network page that features an application code 127 for download. The customer may specify one or more preferred models of an emulated computing device for which the customer is seeking application code 127.

In addition to purchasing and/or downloading the application code 127, the customer may be given an opportunity to use the application code 127 through a simulated interface. To this end, the customer at the client 106 sends a request to launch an application 119 to the emulation server application 114, for example, by activating an emulation request tool. The emulation server application 114 obtains the corresponding application code 127, media encoder 129, wrapper 130, and device interface 137 from the data store 112. The emulation server application 114 then launches the application 119 in the corresponding wrapper 117. The emulation server application 114 tracks the status of the application 119 within the state information 124. In some cases, the video output of the application 119 may be configured to be presented full-screen or not otherwise surrounded by a simulated interface on the screen 148 of the client 106, for example, as in FIG. 2A.

The wrapper 117 provides a hosted environment for execution of the application 119. In some embodiments, the hosted environment may include a virtualized environment for the application 119 that virtualizes one or more resources of the computing device 103. Such resources may include exclusive resources, i.e., resources for which the application 119 requests exclusive access. For example, the application 119 may request full screen access from a video device, which is an exclusive resource because normally only one application can have full screen access.

Furthermore, the wrapper 117 may virtualize input devices such as, for example, keyboards, mice, GPS devices, accelerometers, etc. which may not actually be present in the computing device 103. The data generated by these components may be provided by the data access layer 118. The wrapper 117 may also provide access to a virtual file system to the application 119 in connection with the data access layer 118. In various embodiments, the wrapper 117 may correspond to a virtual machine and/or the wrapper 117 may be executed within a virtual machine.

The user at the client 106 enters input commands for the application 119 by use of the input devices 142 of the client 106. As a non-limiting example, the user may depress a left mouse button. Accordingly, the client application 145 functions to encode the input command into a format that may be transmitted over the network 109 within the application input data 122. The emulation server application 114 receives the input command, adds it to the input queue 125 for the application 119, and ultimately passes it to the wrapper 117. The wrapper 117 then provides a left mouse button depression to the application 119 by way of a virtualized mouse.

It is noted that variable latency characteristics of the network 109 may cause some input commands to be misinterpreted by the application 119 if the input commands are provided to the application 119 as soon as they are received. As a non-limiting example, two single clicks of a mouse button may be misinterpreted as a double click if the first single click is delayed by the network 109 by a greater amount than the second single click. Similarly, mouse clicks and mouse drags may be misinterpreted if the relative temporal relationship between certain input commands is not preserved.

As another non-limiting example, suppose that the application 119 corresponds to a game application within the fighting game genre, e.g., Mortal Kombat, Street Fighter, etc. The user at the client 106 may perform a series of complicated moves through a rapid sequence of input commands. If the input commands are subject to variable latency over the network 109, the series of moves may be misinterpreted by the application 119, thereby resulting in the character controlled by the user not performing the intended moves. For instance, two buttons may need to be pressed within a certain period of time to perform a punch move successfully. If the second input command is delayed by the network 109, but the first input command is not, the move may be unsuccessful without any fault of the user. To remedy this, the emulation server application 114 may delay the first input command to preserve the relative temporal relationship between the first and second input commands. In so doing, the gesture, or command sequence, performed by the user is preserved for the application 119.

Although the additional delay used may be predetermined, it may also be calculated based on the difference between the time period between the commands when generated in the client 106 and the time period between when the commands are received by the emulation server application 114. The time period between the commands when generated in the client 106 may be determined by referring to timestamps in metadata associated with the commands. It is noted that the various fixed latencies in the system (e.g., video encoding delay, minimum network latency) might not adversely impact the functionality of the application 119.

Various techniques related to adding latency and accommodating latency are described in U.S. Patent Application entitled "Adding Latency to Improve Perceived Performance" filed on Oct. 29, 2010 and assigned application Ser. No. 12/916,111, and in U.S. Patent Application entitled "Accommodating Latency in a Service-Based Application" filed on Sep. 17, 2010 and assigned application Ser. No. 12/885,296, both of which are incorporated herein by reference in their entirety.

In some cases, the delay in providing the input command to the application 119 may depend at least in part on a video frame region that is associated with the input command. As a non-limiting example, with an application 119 that is a game, it may be important to delay an input command relating to game play to preserve the meaning of the input command. However, the game screen 148 may also include a chat window, and the input command may be text to be sent to another player in the game by way of the chat window. If the input command relates to the chat window, the wrapper 117 may be configured to provide the input command to the application 119 without additional delay. That is, it may be preferable to send the text to the other user as soon as possible. Accordingly, the delay may depend on whether the input command is related to the region of the screen 148 that is the chat window. Also, it is understood that an application 119 may have multiple modes, where one mode is associated with a delay in providing input commands while another is not.

It may also be important to ensure that the input command is synchronized with the video frame presented to the user on the screen 148 when the user generated the input command in the client 106. As a non-limiting example, because of the various latencies of the system, a fireball intended to be thrown by the character controlled by the user in a fighting game may be thrown later than intended. In some cases, this may not matter. For example, the user may merely want to throw the fireball, and a short delay in throwing the fireball may be perfectly acceptable to the user. However, for more precision, the application 119 may support an API that allows the wrapper 117 to associate a frame number or other temporal identifier with an input command. Therefore, the application 119 can know precisely when the input command was performed and react accordingly. The frame number or other temporal identifier may be sent to the emulation server application 114 by the client application 145 as metadata for the input command.

In some embodiments, different input commands may be presented to the application 119 from those that were generated by a client 106. As a non-limiting example, if a user sends a mouse down command and the client application 145 loses focus, the wrapper 117 may be configured to send a mouse down command followed by a mouse up command. In various embodiments, the input commands may be relayed to the wrapper 117 as soon as possible, or the input commands may be queued by the wrapper 117 in the input queue 125 and relayed to the application 119 sequentially from the queue according to another approach.

Meanwhile, the graphical output of the application 119 is captured by the wrapper 117 and encoded into a media stream. Additionally, the audio output of the application 119 may be captured and multiplexed into the media stream. The graphical output and/or audio output of the application 119 may be captured by hardware devices of the computing device 103 in some embodiments. The media stream is transmitted by the emulation server application 114 to the client 106 over the network 109 as the application output data 123. The client application 145 obtains the application output data 123 and renders a screen 148 on the display 141 in a user interface 250. The screen 148 may be surrounded by a device interface 253 generated from the corresponding device interface 137 that facilitates input and output for the emulated computing device.

In some embodiments, a customer may start an application 119 at one client 106 and continue the application 119 at another client 106. Furthermore, multiple users at diverse locations may participate in an application 119. As a non-limiting example, an application 119 may have been developed to be executed in one device with multiple controllers. Accordingly, the wrapper 117 may be configured to map input commands from one client 106 to a first virtual controller and input commands from another client 106 to a second virtual controller. As another non-limiting example, an application 119 may have been developed to be executed in one device, where one side of the keyboard controls the first player and the other side of the keyboard controls the second player. Accordingly, the wrapper 117 may be configured to map input commands from one client 106 to keys on one side of a virtual keyboard and input commands from another client 106 to keys on another side of the virtual keyboard.

Various embodiments enable input generated through one type of input device 142 in a client 106 to be transformed by the wrapper 117 into input commands provided to the application 119 through an entirely different type of virtual input device. As a non-limiting example, input generated by an accelerometer in the client 106 may be translated by the wrapper 117 into input provided through a virtual mouse. Thus, completely different kinds of input devices 142 may be used in the application 119 that may not have been contemplated when the application 119 was implemented.

Where the input devices 142 incorporate haptic technologies and devices, force feedback may be provided to the input devices 142 within the application output data 123. As a non-limiting example, a simulated automobile steering wheel may be programmed by force feedback to give the user a feel of the road. As a user makes a turn or accelerates, the steering wheel may resist the turn or slip out of control. As another non-limiting example, the temperature of the input device 142 may be configured to change according to force feedback. In one embodiment, force feedback generated from the application input data 122 of one client 106 may be included in the application output data 123 sent to another client 106.

Because the client 106 is decoupled from the hardware requirements of the application 119, the application 119 may be used remotely through a diverse variety of clients 106 that are capable of streaming video with acceptable bandwidth and latency over a network 109. For example, a game application 119 may be played on a client 106 that is a smartphone. Thus, the client 106 need not include expensive graphics hardware to perform the complex three-dimensional rendering that may be necessary to execute the application 119. By contrast, the hardware of the computing device 103 may be upgraded as needed to meet the hardware requirements of the latest and most computationally intensive applications 119. In various embodiments, the video signal in the media stream sent by the emulation server application 114 may be scaled according to the bitrate and/or other characteristics of the connection between the computing device 103 and the client 106 over the network 109.

Having thoroughly tested the application code 127 with an interface that resembles their own computing device, customers are well prepared to purchase the application code 127. At any time, the customer may choose to purchase, lease, and/or download the application code 127 by selecting various purchase components 206, 265. Additionally, if a customer does not own the particular version of the emulated computing device, the customer may decide to purchase a physical version of the emulated computing device after interacting with the virtual version.

In some embodiments, the data access layer 118 may provide access, for the application 119, to data that is ordinarily only locally available to the client 106. Such data may be stored as file data 143 in a data store of the client 106 or in an account of the user in a networked storage system 108. Such data may include data generated by components of the client 106, including GPS devices, accelerometers, etc. The data may be accessed by the data access layer 118 from the client 106 on demand over the network 109, or, periodically, the data may be mirrored in the mirrored files 135 and mirrored device data 136. A library of seed data 138 may be available to provide data for use by applications 119 in addition to the data of the user or when the data of the user is unavailable.

As a non-limiting example, a user may be testing an application 119 that suggests restaurants according to the current location of the user. The application 119 may make a request for a location from a virtualized GPS device. The request for the location may be intercepted by the data access layer 118. If the user is using a client 106 with a GPS device, the data access layer 118 may request and obtain this location from the client 106 over the network. In one embodiment, the GPS location may be mirrored automatically from the client 106 in the mirrored device data 136. If the client 106 does not have a GPS device or if the user has not enabled access to the GPS device, the data access layer 118 may be configured to instead pull a default location from the seed data 138.

As another non-limiting example, a user may be using a photo editor application 119. When the user requests to open a photo for editing, a dialog may appear to select a file. The data access layer 118 may virtualize a local data store for the application 119 which provides access to the file data 143 on the client. Alternatively, the data access layer 118 may provide access to the mirrored files 135 which correspond to a cache or mirrored copy of at least a portion of the file data 143. The data access layer 118 may obtain data such as security credentials from the client 106 and then access the networked storage system 108 to obtain files of the users. Additionally, and if the files of the user are unavailable, the data access layer 118 may allow access to the seed data 138, which may include sample photos. Thus, a user may be able to test the photo editing functionality even when the local files are unavailable.

Various embodiments of the present disclosure may offer many features that are useful to developers of applications 119. By deploying applications 119 through the emulation server application 114, the developers may have the opportunity to test their applications 119 under a variety of emulated platforms by a multitude of different users. Performance of the application 119 may be evaluated for the different emulated devices.

A developer at a developer client 107 may upload a version of the application code 127 to the emulation server application 114 through a web-based interface, file transfer protocol (FTP), email, or other interface. The emulation server application 114 may be configured to obtain the application code 127 from the developer and deploy it for use in the computing device 103 as instances of applications 119. In addition, updates to the application code 127 may be similarly deployed and pushed out to users through the applications 119. This avoids having to wait for users to manually perform updates in the clients 106.

The emulation server application 114 in conjunction with the various wrappers 117 may be configured to collect operational data about the applications 119 for developers. The operational data may be stored in the application feedback 128 and later accessed by developer clients 107. The operational data may include usage analytics (e.g., a duration of use by a user of instances of the application 119, etc.), when the application 119 has crashed and debugging information, and feedback from the users. In one embodiment, the emulation server application 114 may be configured to present a survey to the user through the client application 145. The survey responses may be collected and stored in the application feedback 128. The emulation server application 114 may also be configured to identify potential customers to whom to promote a beta test of an application 119 for a developer.

Figure 3A:
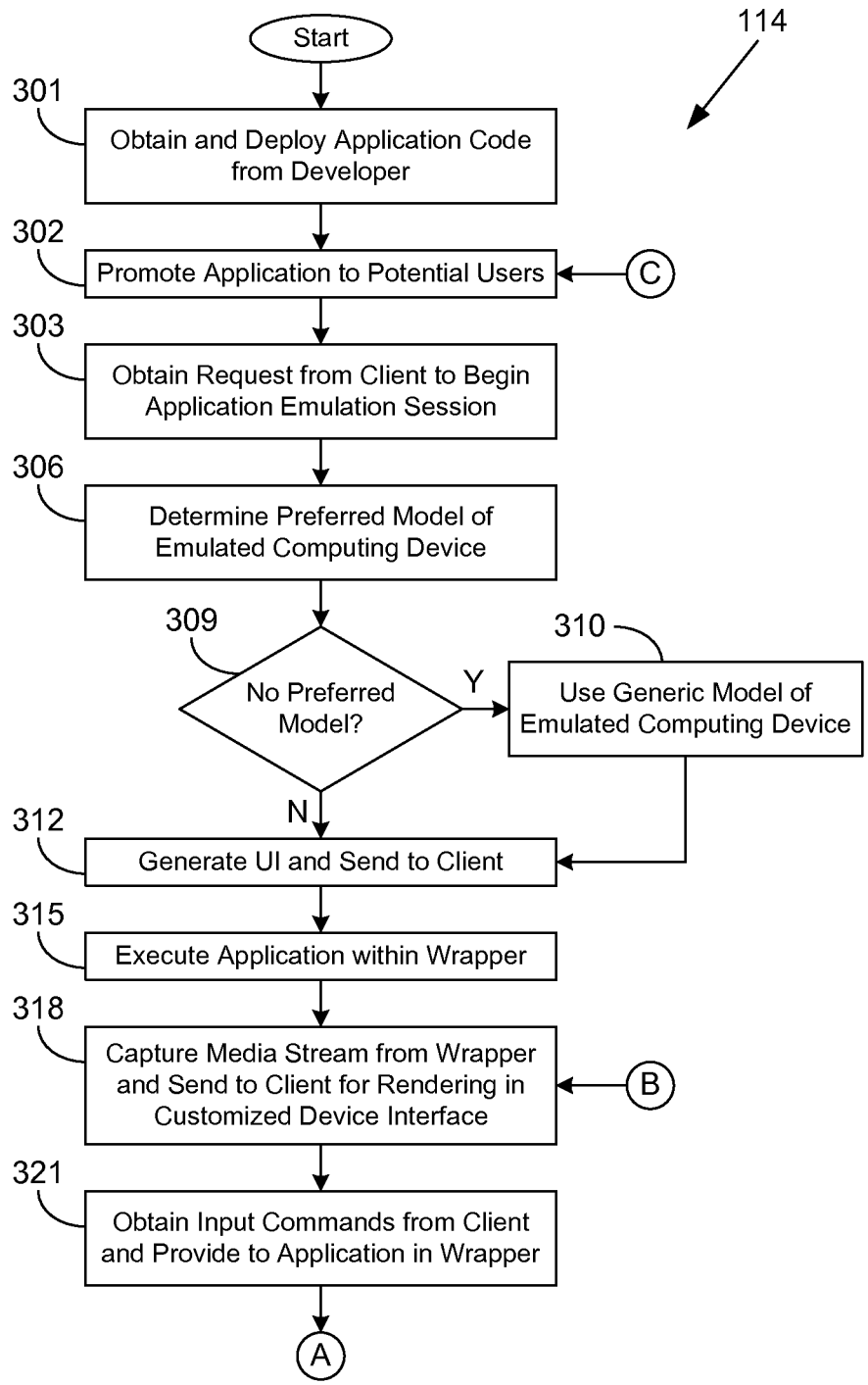
FIGS. 3A and 3B show a flowchart illustrating one example of functionality implemented as portions of an emulation server application executed in a computing device in the networked environment of FIG. 1 according to various embodiments of the present disclosure.
Figure 3B:
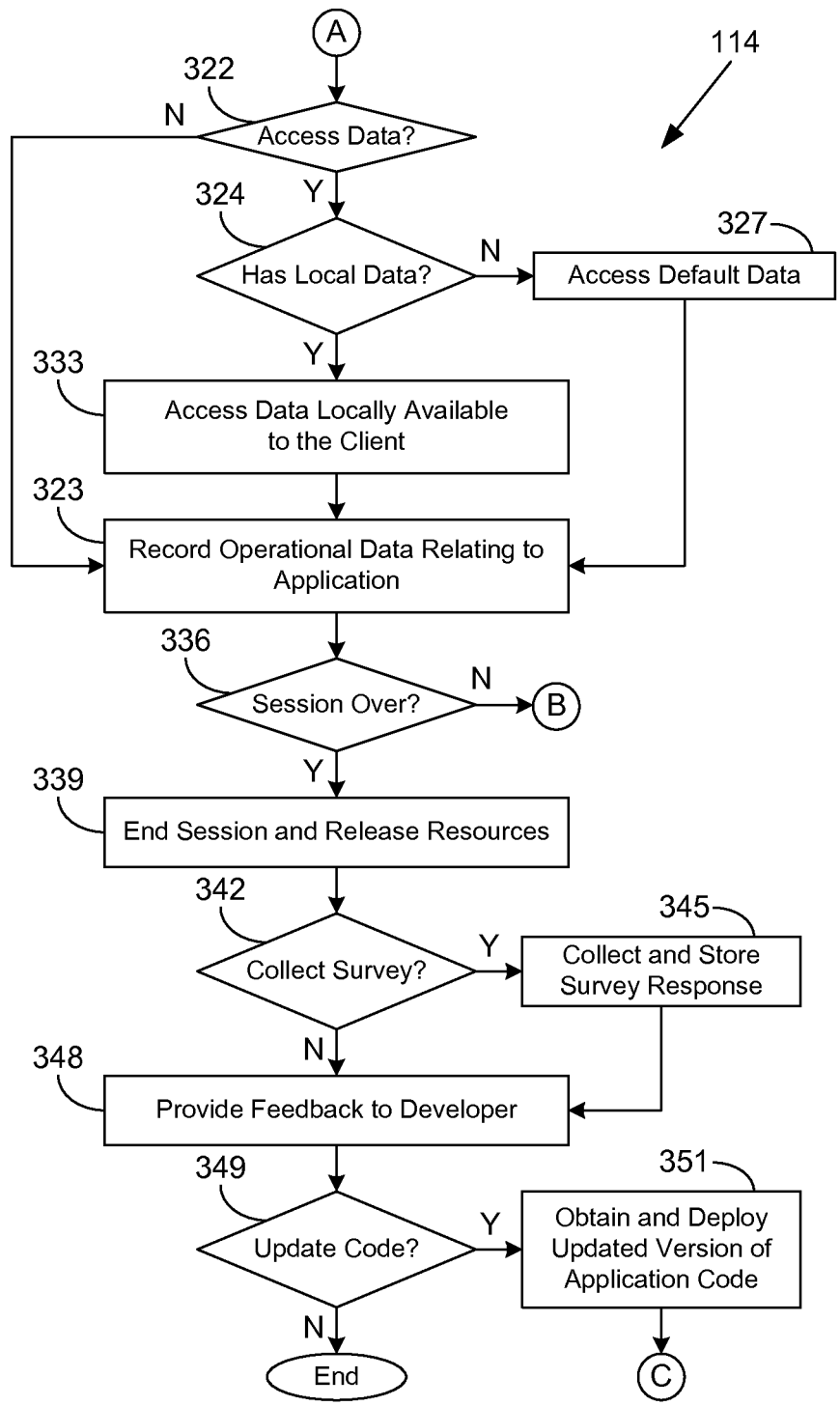

Referring next to FIGS. 3A and 3B, shown is a flowchart that provides one example of the operation of a portion of the emulation server application 114 according to various embodiments. It is understood that the flowchart of FIGS. 3A and 3B provides merely an example of the many different types of functional arrangements that may be employed to implement the operation of the portion of the emulation server application 114 as described herein. As an alternative, the flowchart of FIGS. 3A and 3B may be viewed as depicting an example of steps of a method implemented in the computing device 103 (FIG. 1) according to one or more embodiments.

Beginning with box 301 in FIG. 3A, the emulation server application 114 obtains application code 127 (FIG. 1) from a developer client 107 (FIG. 1) and deploys the application code 127 within the system. This may include compiling or processing the application code 127 for execution within multiple emulated platforms. In box 302, the emulation server application 114 may identify potential customers who may be interested in the application 119 (FIG. 1) and may promote the application 119 to the potential customers. In one example, a developer may manually specify a set of users in the developer data 139 (FIG. 1). In another example, a developer may specify rules for automatically identifying users in the developer data 139. Potential customers may be identified automatically, for example, according to purchase history data, browse history data, review history data, and/or other data. In one scenario, review history data is employed to identify users who are classified as good or thoughtful reviewers.

In box 303, the emulation server application 114 obtains a request from a client 106 (FIG. 1) to begin an application emulation session for a particular application code 127. In box 306, the emulation server application 114 determines a preferred model of the emulated computing device either specified by the customer at the client 106 or otherwise associated with the customer. In box 309, the emulation server application 114 determines whether there is no preferred model indicated. If there is no preferred model indicated, or if a device interface 137 (FIG. 1) for the preferred model is unavailable, the emulation server application 114 moves to box 310 and uses a generic model of the emulated computing device for executing the application code 127 and providing a device interface 253 (FIG. 2B). The emulation server application 114 then continues to box 312. If a preferred model is indicated, the emulation server application 114 also continues to box 312 and uses the preferred model.

In box 312, the emulation server application 114 generates the user interface 252 (FIG. 2B), which may include a customized device interface 253, and sends the corresponding data to the client 106. In box 315, the emulation server application 114 loads the application code 127 and executes an instance of an application 119 (FIG. 1) within a wrapper 117 (FIG. 1) that corresponds to the emulated computing device. In box 318, the emulation server application 114 captures the media stream from the wrapper 117, which may be encoded by the media encoder 120 (FIG. 1) and/or other encoders. The emulation server application 114 sends the media stream to the client 106 as application output data 123 (FIG. 1) for rendering in the customized device interface 253. In some embodiments, the device interface 253 may be embedded into the video signal of the media stream.

In box 321, the emulation server application 114 obtains input commands from the client 106 in application input data 122 (FIG. 1). The emulation server application 114 provides the input commands to the application 119 executing in the wrapper 117. In box 322 of FIG. 3B, the emulation server application 114 determines whether application 119 is requesting access to data. If the application 119 is not requesting access to data, the emulation server application 114 proceeds to box 323. Otherwise, if the application 119 is requesting access to data, the emulation server application 114 instead proceeds from box 322 to box 324. In box 324, the emulation server application 114 determines whether data that is locally available to the client 106 is used by the application 119. If such data is not to be used or is unavailable, the emulation server application 114 in box 327 accesses default data for the application 119 in the seed data 138 (FIG. 1) and provides the default data to application 119 via the data access layer 118 (FIG. 1). The emulation server application 114 proceeds to box 323.

If the emulation server application 114 determines instead that locally available data from the client 106 is to be used and is available, the emulation server application 114 proceeds from box 324 to box 333 and accesses the data locally available to the client 106 and provides the data to the application 119 through the data access layer 118. Such data may be maintained in a local mirror or cache such as in mirrored files 135 (FIG. 1) or in mirrored device data 136 (FIG. 1). Alternatively, such data may be obtained from the client 106 or from a networked storage system 108 (FIG. 1) on behalf of the client 106. The emulation server application 114 continues to box 323.

In box 323, the emulation server application 114 records operational data relating to the application 119. Such data may be recorded in application feedback 128 (FIG. 1). Such data may be useful for usage analytics, marketing, and quality assurance purposes. In box 336, the emulation server application 114 determines whether the session is over. As a non-limiting example, the session may be associated with a timer 263 (FIG. 2B), and the timer 263 may have expired. As another non-limiting example, the session may have been explicitly ended through user interaction at the client 106. As yet another non-limiting example, the session may have been implicitly ended through user inaction at the client 106.

If the session is not over, the emulation server application 114 returns to box 318 in FIG. 3A and continues to capture the media stream from the application 119. If the session is over, the emulation server application 114 proceeds to box 339 and ends the session and releases resources consumed by the session. In box 342, the emulation server application 114 determines whether a survey is to be collected from the client 106. If so, the emulation server application 114 moves to box 345 and collects and stores the survey response in the application feedback 128. The emulation server application 114 proceeds to box 348. If no survey is collected, the emulation server application 114 also moves to box 348.

In box 348, the emulation server application 114 provides the application feedback 128 to the developer at the developer client 107. Such data may be provided in the form of an email message, bulk data upload, network page, and/or other formats. In box 349, the emulation server application 114 determines whether the application code 127 is to be updated. If the application code 127 is to be updated, the emulation server application 114 proceeds to box 351. In box 351, the emulation server application 114 obtains and deploys an updated version of the application code 127 from the developer client 107. Thereafter, the emulation server application 114 may return to box 302 of FIG. 3A and promote the update to current and/or potential users. Any future instance of an application 119 will be configured to use the updated version of the application code 127, if applicable to the emulated computing device. If the emulation server application 114 instead determines that the application code 127 is not to be updated, the portion of the emulation server application 114 ends.

Figure 4:
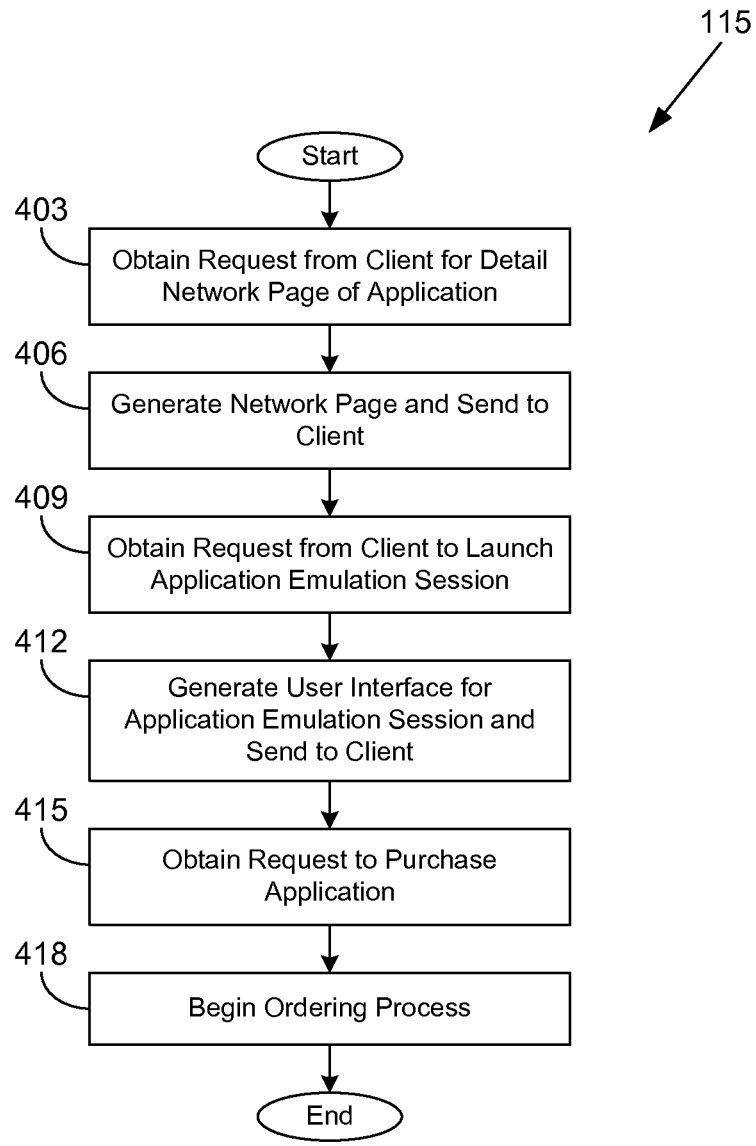
FIG. 4 is a flowchart illustrating one example of functionality implemented as portions of an electronic commerce application executed in a computing device in the networked environment of FIG. 1 according to various embodiments of the present disclosure.

Moving on to FIG. 4, shown is a flowchart that provides one example of the operation of a portion of the electronic commerce application 115 according to various embodiments. It is understood that the flowchart of FIG. 4 provides merely an example of the many different types of functional arrangements that may be employed to implement the operation of the portion of the electronic commerce application 115 as described herein. As an alternative, the flowchart of FIG. 4 may be viewed as depicting an example of steps of a method implemented in the computing device 103 (FIG. 1) according to one or more embodiments.

Beginning with box 403, the electronic commerce application 115 obtains a request from a client 106 (FIG. 1) for a detail network page regarding an application code 127 (FIG. 1). In box 406, the electronic commerce application 115 generates the network page and sends the network page to the client 106. In box 409, the electronic commerce application 115 obtains a request from the client 106 to launch an application emulation session. In box 412, the electronic commerce application 115 generates a user interface 252 (FIG. 2B) or a portion of the user interface 252 for the application emulation session in conjunction with the emulation server application 114 and sends the corresponding data to the client 106 for rendering on a display 141 (FIG. 1).

In box 415, the electronic commerce application 115 obtains a request to purchase the application code 127. In box 418, the electronic commerce application 115 begins an ordering process to complete the order for the application code 127 by the customer, which may involve various tasks in an order pipeline. Thereafter, the portion of the electronic commerce application 115 ends.

Figure 5:
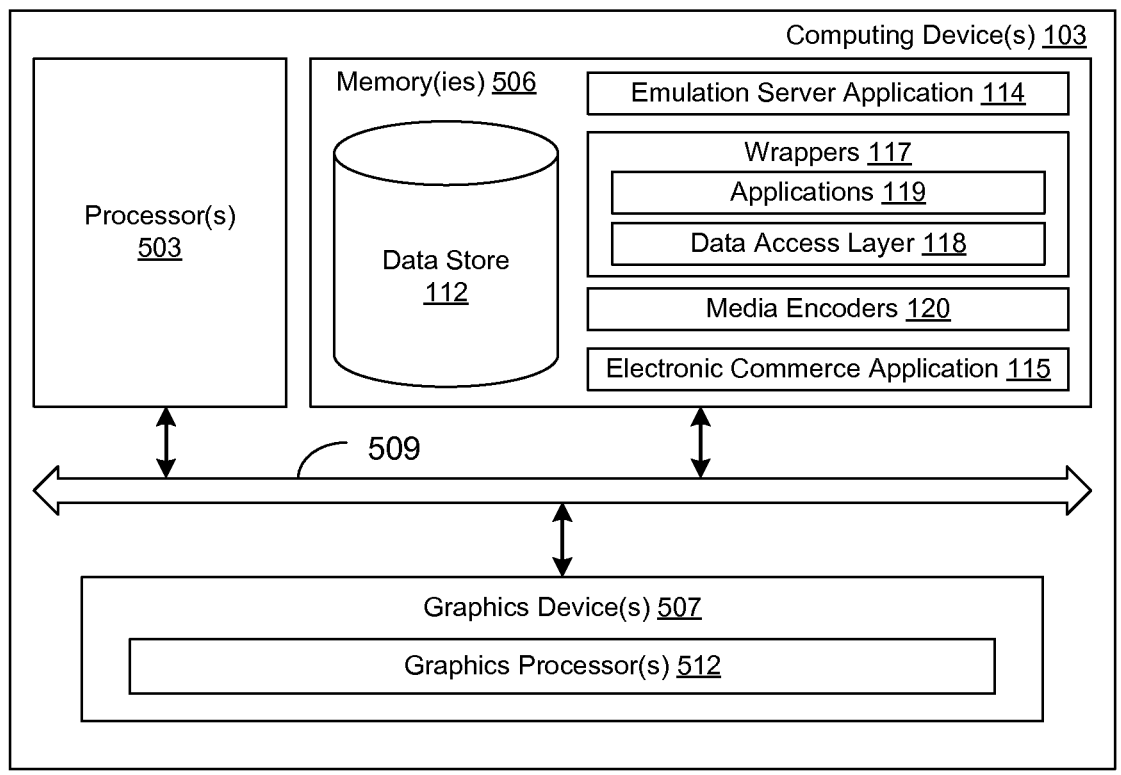
FIG. 5 is a schematic block diagram that provides one example illustration of a computing device employed in the networked environment of FIG. 1 according to various embodiments of the present disclosure.

With reference to FIG. 5, shown is a schematic block diagram of the computing device 103 according to an embodiment of the present disclosure. The computing device 103 includes at least one processor circuit, for example, having a processor 503, a memory 506, and, optionally, one or more graphics devices 507, all of which are coupled to a local interface 509. To this end, the computing device 103 may comprise, for example, at least one server computer or like device. The local interface 509 may comprise, for example, a data bus with an accompanying address/control bus or other bus structure as can be appreciated. The graphics devices 507 may correspond to high-performance graphics hardware, including one or more graphics processors 512. The graphics devices 507 are configured to render graphics corresponding to the applications 119 executed in the computing device 103.

Stored in the memory 506 are both data and several components that are executable by the processor 503. In particular, stored in the memory 506 and executable by the processor 503 are the emulation server application 114, the electronic commerce application 115, the wrappers 117, the data access layers 118 the applications 119, the media encoders 120, and potentially other applications. Also stored in the memory 506 may be a data store 112 and other data. In addition, an operating system may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Delphi®, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network 109 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the emulation server application 114, electronic commerce application 115, the wrappers 117, the data access layers 118, the applications 119, the media encoders 120, the client application 145 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3A, 3B, and 4 show the functionality and operation of an implementation of portions of the electronic commerce application 115 and the emulation server application 114. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3A, 3B, and 4 show a specific order of execution, it is understood that the order of execution may differ from that which is depicted. For example, the order of execution of two or more blocks may be scrambled relative to the order shown. Also, two or more blocks shown in succession in FIGS. 3A, 3B, and 4 may be executed concurrently or with partial concurrence. Further, in some embodiments, one or more of the blocks shown in FIGS. 3A, 3B, and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the emulation server application 114, the electronic commerce application 115, the wrappers 117, the data access layers 118, the applications 119, the media encoders 120, and the client application 145, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:

at least one computing device; and a server application executable in the at least one computing device, wherein when executed the server application causes the at least one computing device to at least:

execute a plurality of instances of an application in a hosted environment, wherein at least some of the plurality of instances of the application are individually executed in a respective one of a plurality of different virtualized environments, and individual ones of the plurality of different virtualized environments correspond to a different emulated computing device;

responsive to receiving source code of the application, compile the source code into code configured for execution by a respective different emulated computing device;

encode a video signal captured from a first instance of the application into a first media stream;

send the first media stream to a corresponding one of a plurality of client computing devices, individual ones of the plurality of client computing devices being associated with respective application users;

provide a first input command to the first instance of the application, the first input command being obtained from the corresponding one of the plurality of client computing devices; and record operational data related to the first instance of the application.

2. The system of claim 1, wherein at least a portion of the operational data relates to debugging information for the application.

3. The system of claim 1, wherein at least a portion of the operational data relates to a duration of use of the application for individual ones of the respective application users.

4. The system of claim 1, wherein when executed the server application further causes the at least one computing device to at least provide the operational data to a developer of the application.

5. The system of claim 1, wherein when executed the server application further causes the at least one computing device to at least:

provide a survey regarding the application to individual ones of the respective application users;

receive respective responses to the survey from the individual ones of the respective application users; and provide the respective responses to the survey to a developer of the application.

6. The system of claim 1, wherein when executed the server application further causes the at least one computing device to at least:

obtain an updated version of the application from a developer of the application; and deploy the updated version of the application in the hosted environment, wherein a future instance of the application employs the updated version of the application.

7. A method, comprising:

separately compiling, via at least one of one or more computing devices, an application for a plurality of emulated platforms;

executing, via at least one of the one or more computing devices, a plurality of instances of the application in a hosted environment;

encoding, via at least one of the one or more computing devices, a video signal captured from a first instance of the application into a first media stream;

sending, via at least one of the one or more computing devices, the first media stream to a corresponding one of a plurality of client computing devices, individual ones of the plurality of client computing devices being associated with respective application users;

providing, via at least one of the one or more computing devices, a first input command to the first instance of the application, the first input command being obtained from the corresponding one of the plurality of client computing devices; and recording, via at least one of the one or more computing devices, operational data related to the first instance of the application.

8. The method of claim 7, wherein the plurality of instances are controlled by a plurality of users.

9. The method of claim 7, wherein the operational data indicates a duration of use for individual ones of the plurality of instances.

10. A method, comprising:

identifying, via at least one of the one or more computing devices, a plurality of potential users for an application;

promoting, via at least one of the one or more computing devices, a beta test of the application to the plurality of potential users;

executing, via at least one of the one or more computing devices, a plurality of instances of the application in a hosted environment;

encoding, via at least one of the one or more computing devices, a video signal captured from a first instance of the application into a first media stream;

sending, via at least one of the one or more computing devices, the first media stream to a corresponding one of a plurality of client computing devices, individual ones of the plurality of client computing devices being associated with respective application users;

providing, via at least one of the one or more computing devices, a first input command to the first instance of the application, the first input command being obtained from the corresponding one of the plurality of client computing devices; and recording, via at least one of the one or more computing devices, operational data related to the first instance of the application.

11. The method of claim 7, further comprising:

receiving, via at least one of the one or more computing devices, an updated version of the application; and deploying, via at least one of the one or more computing devices, the updated version of the application to the plurality of emulated platforms in the hosted environment.

12. The method of claim 7, further comprising:

providing, via at least one of the one or more computing devices, a survey to a plurality of users of the application; and recording, via at least one of the one or more computing devices, a plurality of survey results from the plurality of users.

13. The system of claim 1, wherein when executed the server application further causes the at least one computing device to at least:

identify a plurality of potential users for the application; and promote a beta test of the application to the plurality of potential users.

* * * * *